May 23, 1944.  E. W. CLEMENTS  2,349,239

CLUTCH OPERATING MEANS

Original Filed Feb. 15, 1940

INVENTOR
ERNEST W. CLEMENTS
BY Alfred R. Fuchs
ATTORNEY

Patented May 23, 1944

2,349,239

UNITED STATES PATENT OFFICE 2,349,239

CLUTCH OPERATING MEANS

Ernest W. Clements, Kansas City, Kans., assignor to Andrew A. Kramer, Kansas City, Mo.

Original application February 15, 1940, Serial No. 319,091. Divided and this application July 20, 1942, Serial No. 451,537

6 Claims. (Cl. 192—48)

My invention relates to clutches, and more particularly to operating means for clutches. This is a division of my co-pending application Serial No. 319,091, filed February 15, 1940, on Respirator.

It is a particular purpose of my invention to provide clutch operating or adjusting means that is simple and compact in construction and simple to adjust. My clutch shifting or adjusting means is particularly adapted for use by persons who are not skilled in mechanics and who must be provided with means for operating a clutch, which requires no skill to operate the same. The clutch shifting means is particularly adapted for use with such devices as respirators, in which a simple adjusting means for a clutch member is provided, whereby any person unskilled in mechanics, such as a nurse, can adjust the driving mechanism of the respirator quickly and reliably, so as to shift from motor driven operation to hand driven operation, and vice versa, without delay and without the necessity of operating any complicated mechanical devices that might cause confusion of such an unskilled operator in times of emergency.

It is particularly a purpose of my invention to provide clutch mechanism of the above mentioned character, with means for operating the same that is of a self-locking character, so that the clutch will be held in the adjusted position to which the same has been moved. The purpose of this is to provide means whereby a respirator or similar device can be readily driven either by power or by hand, an auxiliary hand drive being provided in case of power failure, or where power is not available, the change from power drive to hand drive, and vice versa, being a simple adjustment. The self-locking adjusting means is provided so that the clutch will remain in adjusted position without any further attention and will not come out of adjustment unintentionally, but will remain in the particular position to which the same has been adjusted by the operator of the device until reset to a different position.

Other objects and advantages of my invention will appear as the description of the drawing proceeds. I desire to have it understood, however, that I do not intend to limit myself to the particular details shown or described, except as defined in the claims.

Figure 1:
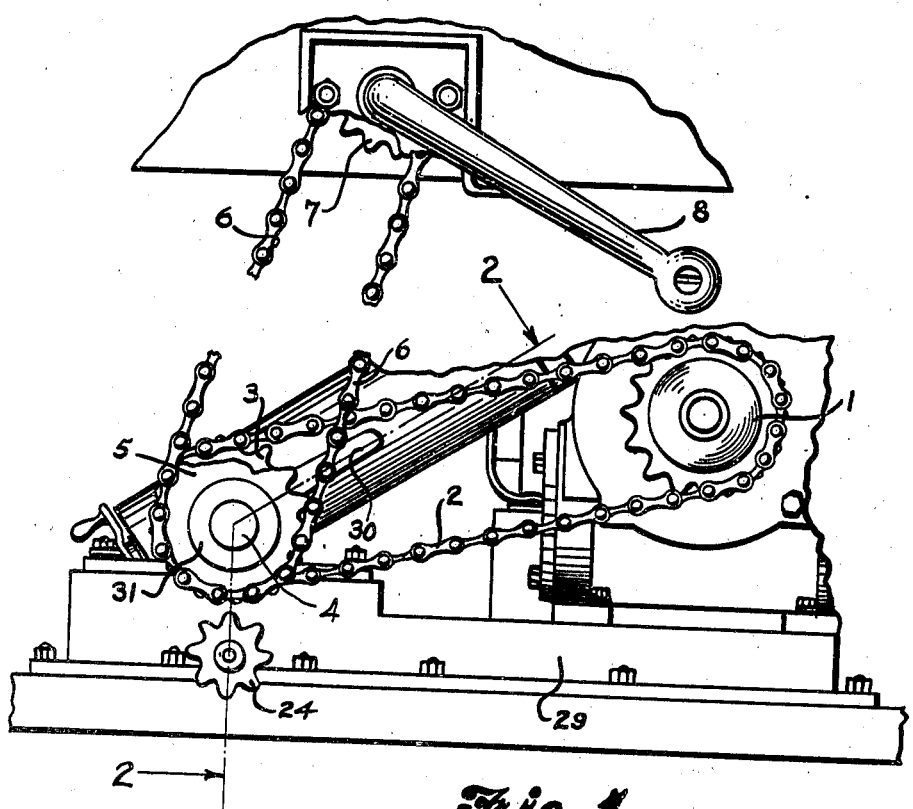
Fig. 1 is an elevational view, partly broken away, of a driving mechanism for a pumping means for a respirator, with my improved clutch shifting means applied thereto.
Figure 2:
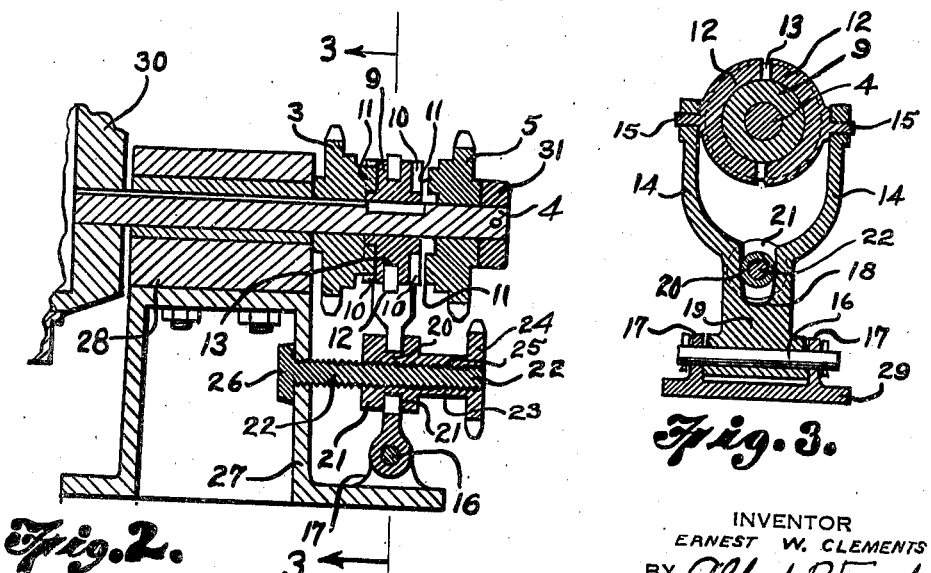
Fig. 2 is a sectional view through a portion of the driving mechanism, taken substantially on the line 2—2 of Fig. 1, showing the details of the shifting mechanism.
Figure 3:
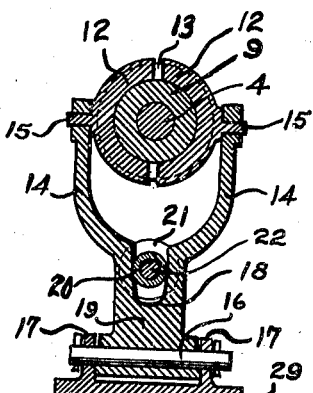
Fig. 3 is a section taken on the line 3—3 of Fig. 2.

Referring in detail to the drawing, my improved means for selecting a power drive or manual drive for a respirator comprises a shaft 4 upon which are loosely mounted the sprockets 3 and 5, the sprocket 3 having a chain 2 operating thereover and over a sprocket 1, which is power driven, and the sprocket 5 having a chain 6 operating over the same and over the sprocket 7 which is rotated manually by means of the crank 8. A collar 31 is provided to hold said sprocket 5 on the shaft 4.

The selective means is provided for connecting either the sprocket 3 or the sprocket 5 with the shaft 4, so as to reciprocate the pumping mechanism provided for the respirator, this being dependent upon whether it is desired to operate the device by manual means or by means of an electric motor, or because of the necessity of operating the respirator by means of the hand crank in case of power failure. Said means comprises a shiftable clutch member 9, which is keyed on the shaft 4, so as to rotate therewith, but is slidable lengthwise of said shaft. Said shiftable clutch member 9 is provided with alternating projections 11 and recesses 10 that cooperate with similar projections and recesses on either the member 5 or the member 3, depending upon the position of the shiftable clutch member 9 to rotate the member 9 either as a unit with the member 3 or as a unit with the member 5.

The shifting mechanism for the clutch member 9 comprises a pair of arcuate shoes 12 that operate in the annular circumferential groove 13 in the member 9, said shoes 12 being mounted on the arms 14 of a forked shifting member by means of the pivots 15, so that these can adjust themselves to the position of said forked shifting member about its pivot 16 without binding in the groove in the clutch member 9. The pivot member 16 is a pin mounted in ears 17 on the base member 29.

The forked shifting lever is provided with a groove, or recess, 18 therein between the arms 14 at their junction with the lower body portion 19 thereof, said groove, or recess, 18 constituting a vertically extending slot in said shifting member open at its upper end. A spool-like member 20 having a pair of flanges 21, that are located one on each side of the shifting member 19, has the resulting groove therein located in the recess or slot 18 in said shifting member and is internally threaded to receive the screw-threads on the threaded rod-like member 22.

Said spool-like member 20 has a forward extension 23, which terminates in a handle 24, which is provided for rotating the spool-like member to adjust the same on the screw-threaded rod-like member 22, the internal threads in said spool and extension being indicated by the numeral 25. The threaded rod-like member 22 has a head 26 thereon that is fixed to the wall 27 of the base of the bearing member 28 mounted on the base 29, by welding the same thereto, so that it will not rotate. Thus rotation of the member 24 will move the spool-like member 20 toward and away from the wall 27 and thus rock the shifting member 19 on its pivot 16 to adjust the clutch member 9 to a position such that it will either be in engagement with the motor driven sprocket 3 or the manually driven sprocket 5 to rotate the shaft 4. Said shaft may drive any suitable member such as a crank 30 of a mechanism for driving the pumping means of a respirator.

It will be obvious that by providing a clutch shifting device that comprises a forked lever that is pivoted at one end and which carries shoes at the other end that are mounted in a groove in the shiftable clutch member, and with the adjusting means between said pivot and said clutch member, comprising the spool-like member mounted in a slot in the lever, a very compact and simple self-locking means for adjusting the position of the clutch from one in which the sprocket 5 drives the shaft 4 to one in which the sprocket 3 drives the shaft 4, and vice versa, is provided, which is operated by the mere rotation of a rotatable handle member, such as the handle member 24, the adjusting means being in a readily accessible position, as will be obvious from Fig. 1. Thus any unskilled person can readily, by rotation of the handle member as far as it will go in either one direction or the other, adjust the position of the clutch member so as to drive the shaft 4 and thus the respirator, or other similar device driven thereby, either by means of the crank 8 or by a motor that drives the sprocket 1 through suitable speed reducing and adjusting mechanism, which does not form a part of this invention. Very simple instructions can thus be given for operating the adjusting means, which any person, whether skilled in mechanics or not, can follow to get the desired hand operation of the device in case of emergency, such as a power failure, or in case the respirator in which the clutch mechanism is used is shipped to a location in which there is no electric power and where there are no persons skilled in mechanics to adjust it for operation.

What I claim is:

1. In a device of the character described, a shaft, a pair of driving members mounted on said shaft for rotation relative thereto, a grooved clutch member slidably mounted on said shaft between said driving members for rotation with said shaft, said driving members and said clutch member having interengaging formations thereon for rotating either of said driving members and said clutch member as a unit, and means for moving said clutch member lengthwise of said shaft alternatively into interengaging relation with said driving members comprising a lever pivotally mounted on a pivot at one end thereof, a pair of shoes engaging in the groove in said clutch member and pivotally mounted on said lever at the other end thereof, and self-locking adjusting means engaging said lever between its pivot and said shoes for rocking said lever on its pivot, comprising a rotatable self-locking operating member.

2. In a device of the character described, a shaft, a pair of driving members mounted on said shaft for rotation relative thereto, a grooved clutch member slidably mounted on said shaft between said driving members for rotation with said shaft, said driving members and said clutch member having interengaging formations thereon for rotating either of said driving members and said clutch member as a unit, and means for moving said clutch member lengthwise of said shaft alternatively into interengaging relation with said driving members comprising a forked lever pivotally mounted on a pivot at one end thereof and having a pair of arms embracing said clutch member at the other end thereof, a pair of shoes engaging in the groove in said clutch member and pivotally mounted on the extremities of said arms, and self-locking screw-threaded adjusting means engaging said lever between its pivot and said shoes for rocking said lever on its pivot.

3. In a device of the character described, a shaft, a pair of driving members mounted on said shaft for rotation relative thereto, a grooved clutch member slidably mounted on said shaft between said driving members for rotation with said shaft, said driving members and said clutch member having interengaging formations thereon for rotating either of said driving members and said clutch member as a unit, and means for moving said clutch member lengthwise of said shaft alternatively into interengaging relation with said driving members comprising a lever pivotally mounted on a pivot at one end thereof, a pair of shoes engaging in the groove in said clutch member and pivotally mounted on said lever at the other end thereof, and self-locking adjusting means comprising a screw-threaded member mounted in fixed position to extend parallel to the axis of said shaft, and a member having screw-threaded engagement with said screw-threaded member having means on one end thereof for rotating the same and having means thereon embracing said lever to rock the same on its pivot upon rotation of said member.

4. In a device of the character described, a shaft, a pair of driving members mounted on said shaft for rotation relative thereto, a grooved clutch member slidably mounted on said shaft between said driving members for rotation with said shaft, said driving members and said clutch member having interengaging formations thereon for rotating either of said driving members and said clutch member as a unit, and means for moving said clutch member lengthwise of said shaft alternatively into interengaging relation with said driving members comprising a lever having a pivot opening adjacent one end thereof, and being bifurcated to provide a pair of arms extending from a point spaced from said pivot opening to the other end thereof, a pivot member extending through said opening, said lever having a slot therein extending into the same from between said arms, a screw-threaded member mounted in fixed position to extend parallel to the axis of said shaft, a flanged member having screw-threaded engagement with said screw-threaded member mounted in said slot with said lever mounted between a pair of spaced flanges thereon and having means thereon for rotating the same, and a pair of shoes engaging in the groove in said clutch member and pivotally connected with the extremities of said arms to swing about axes parallel to the axis of said pivot member.

5. In a device of the character described, a shaft, a pair of driving members mounted on said shaft for rotation relative thereto, a grooved clutch member slidably mounted on said shaft between said driving members for rotation with said shaft, said driving members and said clutch member having interengaging formations thereon for rotating either of said driving members and said clutch member as a unit, and means for moving said clutch member lengthwise of said shaft alternatively into interengaging relation with said driving members comprising a lever pivotally mounted on a pivot at one end thereof, a pair of shoes engaging in the groove in said clutch member and pivotally mounted on said lever at the other end thereof, and self-locking adjusting means comprising a screw-threaded member mounted in fixed position to extend parallel to the axis of said shaft, and a spool-like member having screw-threaded engagement with said screw-threaded member having means on one end thereof for rotating the same and having a pair of spaced flanges thereon engaging the opposite sides of said lever to swing the same about said pivot upon rotation of said spool-like member.

6. In a device of the character described, a shaft, a pair of driving members mounted on said shaft for rotation relative thereto, a grooved clutch member slidably mounted on said shaft between said driving members for rotation with said shaft, said driving members and said clutch member having interengaging formations thereon for rotating either of said driving members and said clutch member as a unit, and means for moving said clutch member lengthwise of said shaft alternatively into interengaging relation with said driving members comprising a lever pivotally mounted to swing about a fixed axis adjacent one end thereof, said lever being bifurcated to provide a pair of arms at the other end thereof embracing said clutch member, said lever having an open ended slot therein extending toward said pivot from between said arms, a fixed screw-threaded member extending parallel to said shaft, an adjusting member mounted in said slot and having means thereon engaging opposite sides of said lever, said adjusting member having means thereon for rotating the same and having screw-threaded engagement with said fixed member, and a pair of shoes swingingly mounted on the extremities of said arms and engaging in said groove in said clutch member.

ERNEST W. CLEMENTS.